US012716565B2

(12) United States Patent
Tanaka

(10) Patent No.: US 12,716,565 B2
(45) Date of Patent: Aug. 25, 2026

(54) VEHICLE EXTERIOR COMPONENT

(71) Applicant: TOYODA GOSEI CO., LTD., Kiyosu (JP)

(72) Inventor: Yuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/231,862

(22) Filed: Jun. 9, 2025

(65) Prior Publication Data

US 2026/0009518 A1 Jan. 8, 2026

(30) Foreign Application Priority Data

Jul. 3, 2024 (JP) ................................ 2024-107209

(51) Int. Cl.

| | |
|---|---|
| ***F21S 43/50*** | (2018.01) |
| ***F21S 43/14*** | (2018.01) |
| ***F21S 43/20*** | (2018.01) |
| ***F21W 104/00*** | (2018.01) |
| *F21Y 115/10* | (2016.01) |

(52) U.S. Cl.

CPC ............ *F21S 43/51* (2018.01); *F21S 43/265* (2024.05); *F21S 43/14* (2018.01); *F21W 2104/00* (2018.01); *F21Y 2115/10* (2016.08)

(58) Field of Classification Search

CPC .......... F21S 43/14; F21S 43/265; F21S 43/51; F21Y 215/10; F21W 2104/00

See application file for complete search history.

(56) References Cited

U.S. PATENT DOCUMENTS

| | | | | |
|---|---|---|---|---|
| 2017/0357044 | A1* | 12/2017 | Kuramitsu | G02B 6/005 |
| 2018/0334094 | A1* | 11/2018 | Myszka | F21S 43/14 |
| 2025/0003568 | A1* | 1/2025 | Hanlon | F21S 43/265 |

FOREIGN PATENT DOCUMENTS

| | | | | | |
|---|---|---|---|---|---|
| CN | 213019463 | U | * | 4/2021 | |
| CN | 120171436 | A | * | 6/2025 | B60Q 1/2661 |
| DE | 102015122689 | A1 | * | 7/2016 | B60R 13/005 |
| DE | 202016105622 | U1 | * | 10/2016 | F21S 43/14 |
| EP | 4603334 | A1 | * | 8/2025 | F21S 43/14 |
| JP | 2007091085 | A | * | 4/2007 | |
| JP | 2022-091007 | A | | 6/2022 | |
| KR | 102278050 | B1 | * | 7/2021 | F21S 45/47 |
| WO | WO-2024034558 | A1 | * | 2/2024 | F21S 43/249 |

OTHER PUBLICATIONS

Innovation Q+ NPL Search (Year: 2025).*

* cited by examiner

*Primary Examiner* — Anabel Ton

(74) *Attorney, Agent, or Firm* — Posz Law Group, PLC

(57) ABSTRACT

The vehicle exterior component includes a light source, a resin housing that includes an opening portion and accommodates the light source, and a cover welded to a peripheral edge of the housing. The cover includes a cover body and a resin frame bonded to a peripheral edge of the cover body. The cover body includes a resin base that has visible light transmittance and a decorative member laminated onto an outer surface of the base. The decorative member includes a light-transmitting portion that transmits visible light and a light shield portion that blocks visible light. The frame includes a part of an outer surface of the cover that overlaps with the peripheral edge of the housing in an opening direction of the open portion.

3 Claims, 3 Drawing Sheets

VEHICLE EXTERIOR COMPONENT

CROSS-REFERENCE TO RELATED APPLICATIONS

This application is based upon and claims the benefit of priority from Japanese Patent Application No. 2024-107209, filed on Jul. 3, 2024, the entire contents of which are incorporated herein by reference.

BACKGROUND

1. Field

The following description relates to a vehicle exterior component.

2. Description of Related Art

Japanese Laid-Open Patent Publication No. 2022-91007 discloses a luminous emblem. The luminous emblem includes a substrate on which a light-emitting element is disposed, an outer lens that guides the light emitted from the light-emitting element, an ornament that is attached to the surface of the outer lens, and a housing that holds the outer lens. A light source is arranged on a surface that faces the housing of the substrate. The outer lens includes a light-emitting portion that is formed as a protrusion. The outer lens is welded to a peripheral portion of the housing in a state in which a circumference of the outer lens is fitted into the peripheral portion of the housing. The ornament includes an opening acting as a transmissive portion transmitting light and an opaque region that does not transmit light. The light-emitting portion of the outer lens is fitted into the opening. The housing is configured to reflect light toward the outer lens. In the luminous emblem, light emitted from the light-emitting element is reflected between the housing and the substrate one or more times before entering the outer lens. Then, the light guided by the outer lens is transmitted through the light-emitting portion, which is exposed from the opening to illuminate a decorative portion displaying letters, symbols, or the like. Thus, the luminous emblem is displayed in a typical manner.

Instead of using the ornament, the above publication also describes the application of paint or plating may be applied to the surface of the outer lens to form a film of paint, a thin film of metal, or the like to act as the opaque region.

In such a luminous emblem, when paint, plating, or the like is applied to the surface of the outer lens and the outer lens is welded to the housing, a horn or an anvil used during ultrasonic welding comes into contact with the outer lens. This may form scratches in the film of paint, the thin film of metal, or the like applied to the surface of the outer lens and adversely affect the aesthetic appearance of the luminous emblem.

Such an issue is not limited to cases in which a horn or an anvil for ultrasonic welding is used. The same issue occurs when, for example, using a jig for vibration welding that also comes into contact with the surface of the outer lens.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle exterior component includes a light source, a resin housing including an open portion open toward an outer side of a vehicle and accommodating the light source, and a cover welded to a peripheral edge of the housing and closing the open portion. The cover includes a cover body that covers the open portion and forms part of an exterior body of the vehicle and a resin frame bonded to a peripheral edge of the cover. The cover body includes a resin base having visible light transmittance and a decorative member laminated onto an outer surface of the base. The decorative member includes a light-transmitting portion that transmits visible light and a light shield portion that blocks visible light. The frame includes a part of an outer surface of the cover that overlaps with the peripheral edge of the housing in an opening direction of the open portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle exterior component according to one embodiment will now be described with reference to FIGS. 1 to 4.

In this description, the term "annular" may refer to any continuous shape that is looped or endless. An annular shape may include, but is not limited to, a circle, an oval, or a polygon having acute or rounded corners.

In the present embodiment, a luminous emblem 14 is attached to a vehicle 10. In the description hereafter, the front-rear direction of the vehicle 10 is simply referred to as the front-rear direction. The front and rear in the front-rear direction will simply be referred to as the front and rear.

Luminous Emblem 14

Figure 1:
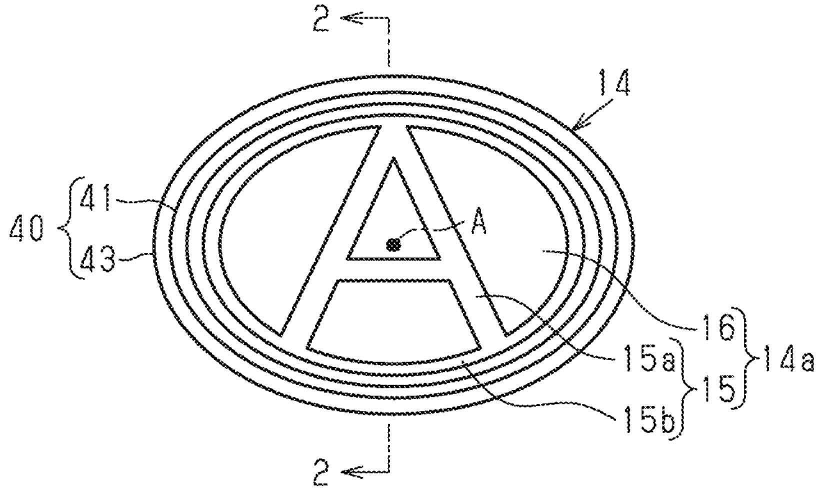
FIG. 1 is a front view of a luminous emblem that is a first embodiment of a vehicle exterior component.
Figure 2:
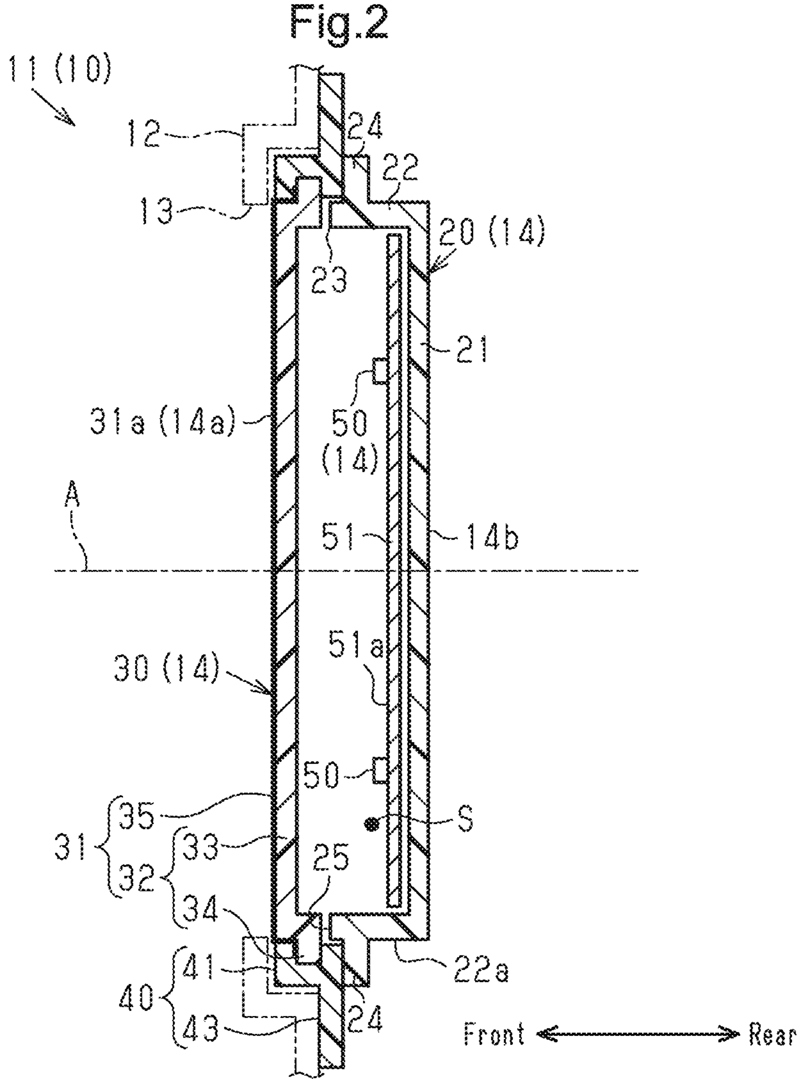
FIG. 2 is a cross-sectional view taken along line 2-2 in FIG. 1.

As shown in FIGS. 1 and 2, a vehicle 10 includes a front section 11. A front panel 12 forming a part of an exterior body is arranged in the front section 11. The front panel 12 includes a window 13 that opens toward the front of the vehicle 10. The luminous emblem 14 is fitted into the window 13 using a double-sided tape, an adhesive, or the like (not shown). In the present embodiment, the luminous emblem 14 is arranged extending in a direction orthogonal to the front-rear direction. In the present embodiment, in the front-rear direction, "outward" is the side that is father away from the central portion of the vehicle 10 and corresponds to "frontward". Thus, in the description hereafter, "out" and "outward" will be referred to as "front" and "frontward".

As shown in FIG. 1, the luminous emblem 14 is circular in a front view. The luminous emblem 14 has an ornamental surface 14*a* including a display region 15 and a background region 16. The display region 15 displays a mark facing the front. The background region 16 is the portion that is not the display region 15. Here, "mark" may be stylized text (logotype) indicating the manufacturer, model, grade, or the like of the vehicle 10; a shape (symbol mark) representing the manufacturer of the vehicle 10, or a logo combining characters and shapes. In the present embodiment, the display region 15 includes a character portion 15*a* that shows the Latin character "A" and an annular portion 15*b* that extends along the peripheral edge of the luminous emblem 14 and surrounds the character portion 15*a*.

The luminous emblem 14 includes a housing 20 that includes an open portion 23, a cover 30 that covers the open portion 23, and light sources 50.

Each component will now be described.

Housing 20

As shown in FIG. 2, the housing 20 includes a bottom wall 21, a peripheral wall 22, and a flange 24. The bottom wall 21 forms a rear surface 14*b* of the luminous emblem 14. The peripheral wall 22 rises frontward from the edge of the bottom wall 21. The circular open portion 23 is formed in the front end of the peripheral wall 22. The open portion 23 is open toward the front. Thus, the front-rear direction of the present embodiment corresponds to the open direction of the open portion in the present disclosure. Hereafter, the direction that extends radially from the axis A of the housing 20 will be referred to as the radial direction. In the radial direction, a side that is closer to the axis A will be referred to as a radially inner side and a side that is farther from the axis A will be referred to as a radially outer side. The flange 24 projects from a radially outer surface 22*a* of the peripheral wall 22 toward the radially outer side. The flange 24 is annular and extends along the radially outer surface 22*a* in a circumferential direction. The flange 24 forms a peripheral edge located at the outermost part of the housing 20.

Figure 3:
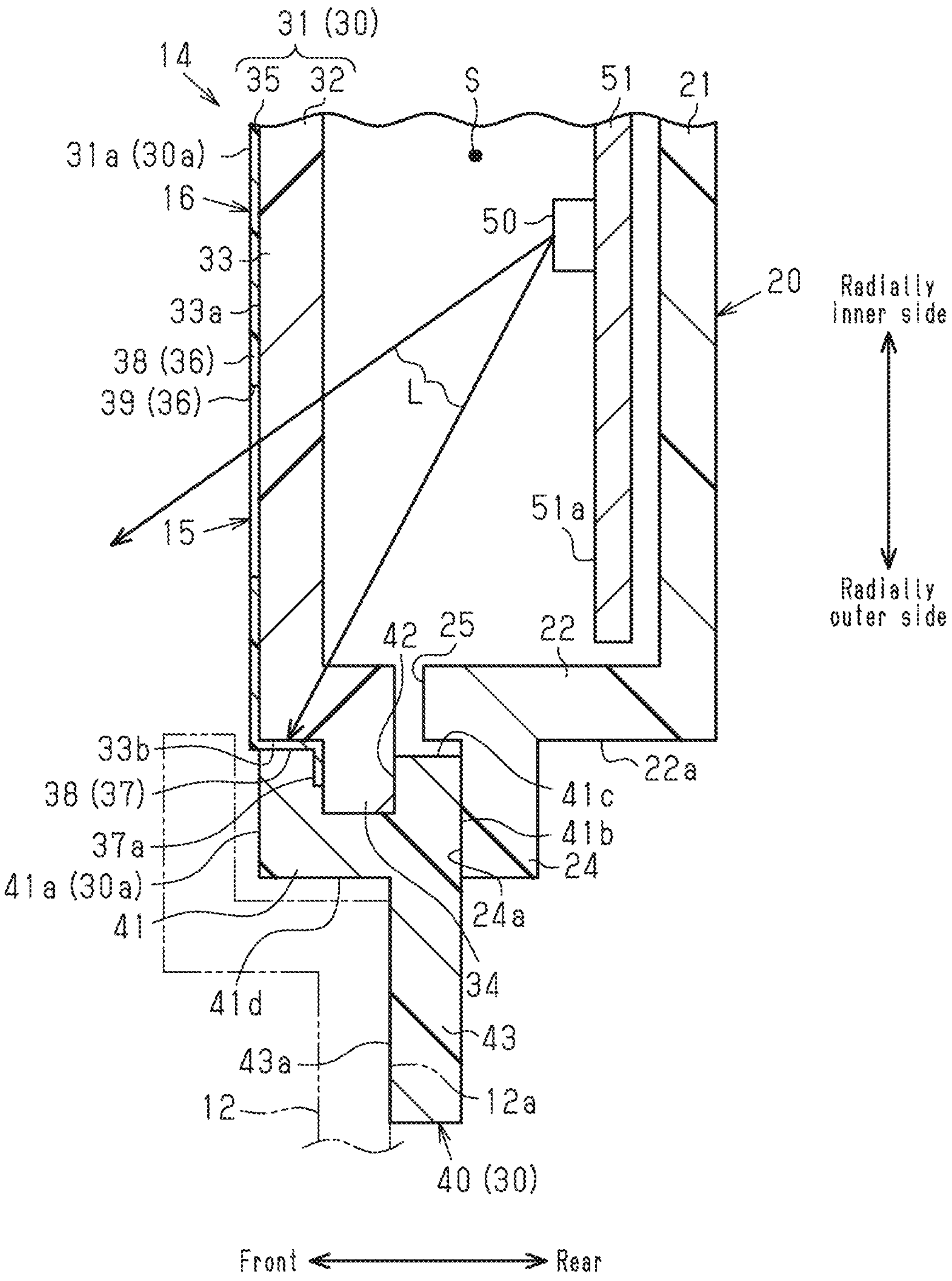
FIG. 3 is an enlarged cross-sectional view of part of a frame shown in FIG. 2.

As shown in FIG. 3, the front end of the peripheral wall 22 projects toward the cover 30 from a front surface 24*a* of the flange 24. In other words, the front end of the peripheral wall 22 extends toward the front from the front surface 24*a*. In the present embodiment, the front end of the peripheral wall 22 corresponds to an annular rib of the present disclosure. Hereafter, the front end of the peripheral wall 22 will be referred to as the rib 25. The projecting height of the rib 25 is set so that when attaching the cover 30 to the housing 20, the rib 25 does not interfere with the cover 30 in the front-rear direction.

The housing 20 is molded integrally from a resin material. The resin material may be, for example, acrylonitrile-butadiene-styrene copolymer (ABS) resin, acrylonitrile-ethylene-styrene copolymer (AES), acrylonitrile-styrene-acrylate copolymer (ASA) or a polymer alloy of polycarbonate (PC) and ABS resin. The housing 20 preferably has a white color, which has high light reflectance. More specifically, the housing 20 is preferably formed from a resin material in which particles of a white light diffusing material are dispersed. The light diffusing material may be, for example, a metal oxide such as titanium oxide or zinc oxide.

Cover 30

As shown in FIGS. 2 and 3, the cover 30 includes a cover body 31 and a frame 40. The cover body 31 includes a front surface 31*a* forming the ornamental surface 14*a* that faces the front and is exposed from the window 13. Thus, the cover body 31 and the front panel 12 form a part of the exterior body of the vehicle 10. The cover body 31 includes a base 32 and a decorative member 35. The base 32 includes a base body 33 and an annular protrusion 34. The base body 33 is substantially flat and covers the open portion 23 from the front. The end of the base body 33 is bent toward the rear. The annular protrusion 34 extends outward from a radially outer surface 33*b* of the base body 33 (refer to FIG. 3). The annular protrusion 34 extends along the radially outer surface 33*b* in the circumferential direction. The annular protrusion 34 forms a peripheral edge located at the outermost part of the cover body 31. The annular protrusion 34 corresponds to the protrusion of the present disclosure.

As shown in FIG. 3, the decorative member 35 is a decorative film formed by a resin film. The decorative member 35 includes a body portion 36 and an extension portion 37. The body portion 36 covers a front surface 33*a* of the base body 33. The body portion 36 is bonded to the front surface 33*a*. The extension portion 37 is bent from the body portion 36 toward the rear. The extension portion 37 includes an edge 37*a* that extends along the annular protrusion 34 toward the radially outer side. The extension portion 37 covers the radially outer surface 33*b* and a part of the annular protrusion 34. The extension portion 37 is bonded to the radially outer surface 33*b* and a part of the annular protrusion 34. The decorative member 35 includes a light shield portion 38 that blocks visible light and a light-transmitting portion 39 that transmits visible light. The light shield portion 38 includes a portion that corresponds to the background region 16 of the body portion 36 and to the extension portion 37. In the present embodiment, the light-transmitting portion 39 is a hole formed at a location that overlaps with the display region 15 in the front-rear direction. The light-transmitting portion 39 exposes the base body 33 toward the front. The display region 15 includes the light-transmitting portion 39 and the portion of the base body 33 exposed toward the front by the light-transmitting portion 39.

The cover body 31, for example, is formed by injection-molding the base 32 together with the decorative member 35, which acts as an insert. The base 32 is formed from a transparent material that has visible light transmittance. The transparent material may be, for example, acrylic resin such as polymethyl methacrylate (PMMA) or a transparent resin such as PC or the like. In the present embodiment, transparency includes colorless transparency and colored transparency. The light shield portion 38 of the decorative member 35 is formed from a mixture of a resin material, such as PC, and a black pigment, such as carbon black.

Frame 40

As shown in FIGS. 2 and 3, the frame 40 includes a frame body 41 and an attaching portion 43. The frame body 41 is an annular member that surrounds the entire peripheral edge of the cover body 31 (annular protrusion 34) in the circumferential direction.

As shown in FIG. 3, a front surface 41*a* of the frame body 41 is substantially flush with the front surface 31*a* of the cover body 31. The front surface 31*a* and the front surface 41*a* form the front surface 30*a* of the cover 30. The front surface 41*a* overlaps with the front surface 24*a* of the flange 24 in the front-rear direction. In a state in which the luminous emblem 14 is fitted into the window 13, the front surface 41*a* is covered by the front panel 12 from the front. A rear surface 41*b* of the frame body 41 is welded to the front surface 24*a* of the flange 24. Thus, the housing 20 and the cover 30 are welded together and form an enclosed space S that is sealed from the outside. The frame body 41 includes a radially inner surface 41*c* that covers the peripheral edge of the cover body 31 (annular protrusion 34). More specifically, the radially inner surface 41*c* includes a recess 42 into which the annular protrusion 34 is fitted. Wall surfaces of the recess 42 are joined in contact with the annular protrusion 34. The extension portion 37 of the decorative member 35 is embedded between the radially inner surface 41*c* and the base 32.

As shown in FIG. 3, the attaching portion 43 projects outward from a radially outer surface 41*d* of the frame body 41. The attaching portion 43 projects further toward the radially outer side from the flange 24 of the housing 20. The front surface 43*a* of the attaching portion 43 is bonded to a rear surface 12*a* of the front panel 12 by a double-sided tape or an adhesive to attach the luminous emblem 14 to the window 13.

The cover 30 is formed through molding methods such as insert molding, two-color molding or the like. When performing insert molding, the frame 40 is injection-molded around the cover body 31 which acts as an insert. When performing two-color molding, the base 32 is molded as a first component, and the frame 40 is subsequently molded as a second component. The frame 40 is a light shield member that blocks visible light. The frame 40 is formed from a mixture of a resin material, such as PC, and a black pigment, such as carbon black.

Light Sources 50

As shown in FIGS. 2 and 3, the light sources 50 are disposed on a substrate 51 and accommodated inside the housing 20, or the enclosed space S. The light sources 50 are disposed on the front surface 51*a* of the substrate 51 and emit visible light toward the cover 30. This visible light is hereafter referred to as light L. The light sources 50 are formed by light-emitting elements such as a light-emitting diodes (LEDs) or the like.

Operation of the Present Embodiment

As shown in FIG. 3, the light L emitted from the light sources 50 is blocked by the light shield portion 38 or the frame 40. Part of the light L transmitted through the base 32 and the light-transmitting portion 39 is emitted toward the front of the vehicle 10. This illuminates and displays the mark of the luminous emblem 14 toward the front of the vehicle 10.

Figure 4:
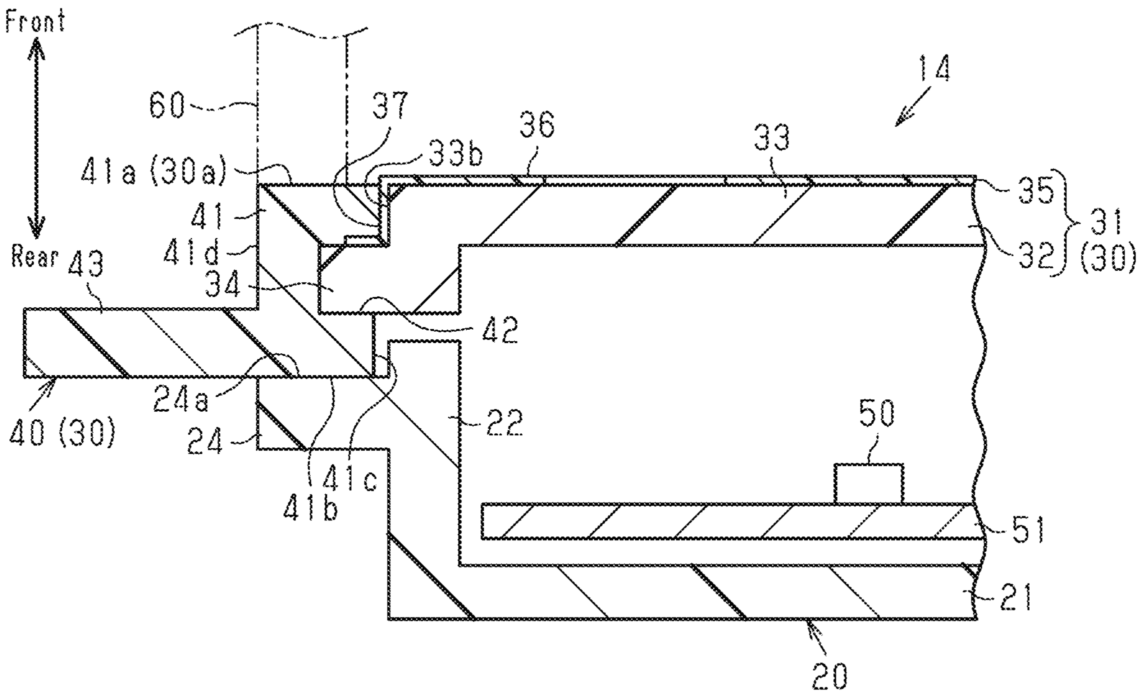
FIG. 4 is a cross-sectional view illustrating the operation of the luminous emblem shown in FIG. 1.

When manufacturing the luminous emblem 14, the cover 30 is welded to the flange 24 of the housing 20. In this case, the part of the front surface 30*a* of the cover 30 that overlaps with the front surface 24*a* of the flange 24 in the front-rear direction is pressed by a horn 60 or an anvil if ultrasonic welding is performed or by a jig if vibration welding is performed. For example, when the surface pressed by the horn 60 or the like (hereafter, referred to as the pressed surface) is the cover body 31, the body portion 36 of the decorative member 35 may be scratched when contacting the horn 60 or the like. In this respect, in the luminous emblem 14 of the present embodiment, as shown in FIG. 4, the surface pressed by the horn 60 is formed by the frame body 41. In other words, the front surface 41*a* of the frame 40 is the pressed surface. This avoids the formation of scratches in the body portion 36 of the decorative member 35.

As shown in FIG. 3, in a state where the luminous emblem 14 is fitted into the window 13, the front surface 41*a* is covered by the front panel 12 from the front. Thus, even if scratches are formed in the front surface 41*a*, the front surface 41*a* is concealed from the front.

Advantages of the Present Embodiment (1) The luminous emblem 14 includes the light sources 50, the resin housing 20, which includes the open portion 23 and accommodates the light sources 50, and the cover 30, which is welded to the flange 24 and covers the open portion 23. The cover 30 covers the open portion 23 and includes the cover body 31, which forms the exterior body of the vehicle 10, and the frame 40, which is bonded to the annular protrusion 34 of the cover body 31 and is formed from resin. The cover body 31 includes the base 32, which has visible light transmittance and is formed from resin, and the decorative member 35, which is laminated onto the front surface 33*a* and the radially outer surface 33*b* of the base 32. The decorative member 35 includes the light-transmitting portion 39 that transmits the light L and the light shield portion 38 that blocks the light L. The frame body 41 includes the front surface 41*a* that is a part of the front surface 30*a* of the cover 30 that overlaps with the front surface 24*a* of the flange 24 in the front-rear direction.

This structure allows the aesthetic appearance of the luminous emblem 14 to be maintained.

(2) The decorative member 35 is a film. The edge 37*a* of the decorative member 35 is engaged with the frame 40.

With this structure, the cover 30, which includes the light-transmitting portion 39 and the light shield portion 38, may be readily formed by simply laminating the film of the decorative member 35 onto the base 32.

With the above structure, the edge 37*a* of the decorative member 35 is engaged with the frame 40. Thus, compared to a case in which the edge 37*a* of the decorative member 35 is simply exposed, separation of the decorative member 35 from the edge 37*a* is less likely to occur. This limits separation of the decorative member 35 from the frame 40.

(3) The decorative member 35 includes the body portion 36, which covers the front surface 33*a* of the base body 33, and the extension portion 37, which is bent and extends from the edge of the body portion 36 and covers the radially outer surface 33*b* of the base body 33. The extension portion 37 is formed by the light shield portion 38. The extension portion 37 is embedded between the base 32 and the frame body 41. The frame 40 is a light shield member that blocks the light L.

With the above structure, the extension portion 37, which is formed by the light shield portion 38, covers the radially outer surface 33*b* of the base body 33. Therefore, as shown in FIG. 3, the light L transmitted from the radially outer surface 33*b* of the base body 33, which is part of the light L emitted from the light sources 50, is blocked by the extension portion 37. This limits frontward leakage of the light L from the radially outer surface 33*b* of the base body 33.

With the above structure, the extension portion 37 is embedded between the base 32 and the frame body 41. Therefore, the edge 37*a* of the decorative member 35 is less likely to be exposed to physical and chemical factors that cause separation. Thus, separation of the decorative member 35 from the base 32 that starts from the edge 37*a* can further be limited.

The extension portion 37 is bent and extends from the edge of the body portion 36. When molding the film of the decorative member 35 into such a shape, the extension portion 37 may be stretched and thus become thinner than other portions. In this case, the part of the light L emitted from the light sources 50 and transmitted through the radially outer surface 33*b* of the base body 33 may leak toward the front through the thinned part of the extension portion 37.

In this respect, with the above structure, the frame 40 covers the extension portion 37. Further, the frame 40 is a light shield member that blocks the light L. Therefore, the light L transmitted through the extension portion 37 is blocked by the frame body 41 that covers the extension portion 37. This limits frontward leakage of the light L from the extension portion 37.

(4) The base 32 includes the base body 33 and the annular protrusion 34 that extends from the radially outer surface 33*b* of the base body 33. The part of the radially inner surface 41*c* of the frame body 41 in the frame 40 bonded to the cover body 31 includes the recess 42 into which the annular protrusion 34 is fitted.

With the above structure, the area of the part of the frame body 41 bonded to the cover body 31 is increased by the area of the annular protrusion 34 of the base 32 fitted in to the recess 42. This increases the bonding strength between the base 32 and the frame 40 which, in turn, increases the bonding strength between the cover body 31 and the frame 40.

(5) The housing 20 includes the bottom wall 21, the peripheral wall 22, which forms the open portion 23, and the flange 24, which projects from the radially outer surface 22*a* of the peripheral wall 22. Further, the housing 20 includes the annular rib 25, which extends toward the front from the front surface 24*a* of the flange 24. The rib 25 is located farther toward the radially inner side than the front surface 24*a* and the rear surface 41*b*, which is the welding portion of the cover 30 and the housing 20.

With this structure, the cover 30 is welded to the flange 24 projecting from the peripheral wall 22 of the housing 20. When welding the cover 30 to the flange 24, melted resin flowing toward the radially inner side may form a burr inside the housing 20. In this regard, with the structure above, the housing 20 includes the rib 25 projecting farther toward the cover 30 than the front surface 24*a* of the flange 24. Further, the rib 25 is located at a radially inner side from where the rear surface 41*b* and the front surface 24*a* are welded to bond the cover 30 and the housing 20. Therefore, the rib 25 restricts the inward flow of melted resin. This limits the formation of burrs inside the housing 20.

(6) The frame 40 includes the frame body 41 and the attaching portion 43, which projects outward from the radially outer surface 41*d* of the frame body 41 and is formed integrally with the frame body 41. The attaching portion 43 includes the front surface 43*a* welded to the rear surface 12*a* of the front panel 12.

With this structure, the attaching portion 43, which is for attaching the luminous emblem 14 to the window 13 of the front panel 12, is formed integrally with the frame body 41. Therefore, when attaching the luminous emblem 14 to the front panel 12, there is no need for a separate attaching portion. Thus, the number of components in the luminous emblem 14 can be reduced.

Modifications

The above-described embodiment may be modified as follows. The above-described embodiment and the following modifications can be combined as long as the combined modifications remain technically consistent with each other.

In the luminous emblem 14, the light sources 50 do not have to be disposed on the front surface 51*a* of the substrate 51, and the light sources 50 may be disposed on a part of the substrate 51 that faces the bottom wall 21 of the housing 20. In this case, the light sources 50 emit light L towards the housing 20. Therefore, the formation of the housing 20 from resin material in which particles of a white light diffusing material are dispersed allows the housing 20 to reflect the light L toward the cover 30 effectively.

The rib 25 may be omitted from the housing 20. In other words, in the housing 20, the front surface 24*a* of the flange 24 may be flush with the front end surface of the peripheral wall 22.

The luminous emblem 14 does not have to be attached to the window 13 of the front panel 12 using a double-sided tape or an adhesive as exemplified in the present embodiment. For example, a through hole may be formed in the attaching portion 43, and a screw may be inserted into the through hole and fastened to a fastening hole of a boss formed on the front panel 12 to attach the attaching portion 43 to the front panel 12.

The frame 40 may include the frame body 41 and the attaching portion 43 may be omitted. In this case, an attaching portion may be provided as a component separate from the luminous emblem 14.

Figure 5:
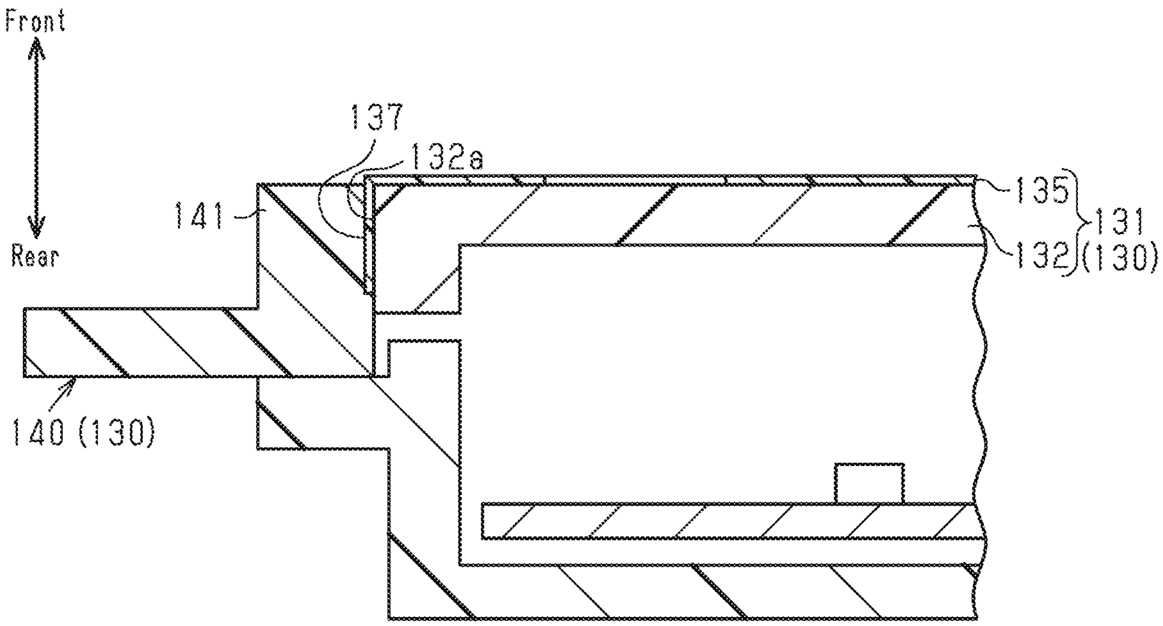
FIG. 5 is a cross-sectional view showing a modified example of the vehicle exterior component.

As shown in FIG. 5, the cover of the present disclosure is not limited to the cover 30 exemplified in the present embodiment. A cover 130 may include a frame 140, in which the recess 42 is omitted from the frame body 41, and a base 132, in which the annular protrusion 34 is omitted from the base 32. In this case, the frame 140 simply covers a radially outer surface 132*a* of the base 132 and an extension portion 137 of a decorative member 135, which is bonded with the radially outer surface 132*a*, from the radially outer side. The radially outer surface 132*a* and the extension portion 137 correspond to an outer edge of a cover body 131.

As exemplified in the present embodiment, the frame 40 does not have to be formed entirely from a mixture of a resin material and a black pigment. For example, the frame may include a base layer formed from any resin material and a light shield layer formed from the above mixture on the front surface of the base layer.

The extension portion 37 may be omitted from the decorative member 35. In this case, for example, the edge of the body portion 36 may be arranged between the radially outer surface 33*b* and the radially inner surface 41*c* of the frame body 41, and the edge of the body portion 36 may be engaged with the frame body 41.

The decorative member of the present disclosure is not limited to the decorative member 35 exemplified in the present embodiment that includes the light-transmitting portion 39, which is defined by a hole. For example, the decorative member may include a film base having an end surface onto which a light shield portion and a light-transmitting portion are printed. In this case, the light-transmitting portion may be printed using, for example, transparent ink.

The decorative member of the present disclosure is not limited to a decorative film that is formed from resin film. For example, the decorative member may be a film of paint applied to the front surface 33*a* of the base body 33 or a thin film of metal formed through sputtering, vacuum deposition, plating or the like.

The vehicle exterior component of the present disclosure is not limited to the luminous emblem 14 attached to the front panel 12, which forms the exterior body in the front section 11 of the vehicle 10. For example, the vehicle exterior component may be an exterior component attached to a back door garnish that forms the exterior body in the rear section of the vehicle 10, a side door garnish or a pillar garnish that forms the exterior body in the side section of the vehicle 10, or the like. When attaching the vehicle exterior component to the vehicle component that is the rear section of the vehicle 10, the outer side of the vehicle of the present disclosure corresponds to the rear side in the front-rear direction of the vehicle 10. Further, when attaching the vehicle exterior component to the vehicle component that is the side section of the vehicle 10, the outer side of the vehicle corresponds to the side that extends away from the central part of the vehicle 10 in the vehicle width direction of the vehicle 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle exterior component, comprising:

a light source;

a resin housing including an open portion open toward an outer side of a vehicle and accommodating the light source; and a cover welded to a peripheral edge of the housing and closing the open portion, wherein the cover includes a cover body that covers the open portion and forms part of an exterior body of the vehicle, and a resin frame bonded to a peripheral edge of the cover, the cover body includes a resin base having visible light transmittance and a decorative member laminated onto an outer surface of the base, the decorative member includes a light-transmitting portion that transmits visible light and a light shield portion that blocks visible light, the frame includes a part of an outer surface of the cover that overlaps with the peripheral edge of the housing in an opening direction of the open portion, the decorative member is a film, the decorative member includes an edge engaged with the frame, the decorative member includes a body portion covering the outer surface of the base and an extension portion bent and extending from an edge of the body portion and covering a radially outer surface of the base, the extension portion includes the light shield portion and is embedded between the base and the frame, and the frame is a light shield member that blocks visible light.

2. A vehicle exterior component, comprising:

a light source;

a resin housing including an open portion open toward an outer side of a vehicle and accommodating the light source; and a cover welded to a peripheral edge of the housing and closing the open portion, wherein the cover includes a cover body that covers the open portion and forms part of an exterior body of the vehicle, and a resin frame bonded to a peripheral edge of the cover, the cover body includes a resin base having visible light transmittance and a decorative member laminated onto an outer surface of the base, the decorative member includes a light-transmitting portion that transmits visible light and a light shield portion that blocks visible light, the frame includes a part of an outer surface of the cover that overlaps with the peripheral edge of the housing in an opening direction of the open portion, the base includes a base body and a protrusion extending from a radially outer surface of the base body, and a part of a radially inner surface of the frame bonded with the cover body includes a recess to which the protrusion is fitted.

3. A vehicle exterior component, comprising:

a light source;

a resin housing including an open portion open toward an outer side of a vehicle and accommodating the light source; and a cover welded to a peripheral edge of the housing and closing the open portion, wherein the cover includes a cover body that covers the open portion and forms part of an exterior body of the vehicle, and a resin frame bonded to a peripheral edge of the cover, the cover body includes a resin base having visible light transmittance and a decorative member laminated onto an outer surface of the base, the decorative member includes a light-transmitting portion that transmits visible light and a light shield portion that blocks visible light, the frame includes a part of an outer surface of the cover that overlaps with the peripheral edge of the housing in an opening direction of the open portion, the housing includes a bottom wall, a peripheral wall forming the opening portion, a flange projecting from a radially outer surface of the peripheral wall and forming a peripheral edge of the housing, and an annular rib projecting further toward the cover from an outer surface of the flange, a direction extending radially from an axis of the housing is referred to as a radial direction and a side closer to the axis in the radial direction is referred to a radially inner side, and the rib is located in the radially inner side of where the cover and the housing are welded.

* * * * *